United States Patent [19]

Martin et al.

[11] 4,129,536

[45] Dec. 12, 1978

[54] VINYL CHLORIDE BASED INJECTION MOLDING COMPOSITION

[75] Inventors: Carl J. Martin, Indianapolis; Robert J. Ryan, Zionsville, both of Ind.

[73] Assignee: RCA Corporation, New York, N.Y.

[21] Appl. No.: 818,280

[22] Filed: Jul. 25, 1977

[51] Int. Cl.² .................... C08F 15/00; C08F 114/02; G11B 3/44

[52] U.S. Cl. ................... 260/23 XA; 179/100.1 B; 179/100.4 M; 260/23 AR; 260/884; 260/998.16; 358/128; 358/129

[58] Field of Search ............ 260/998.16, 884, 23 XA, 260/23 AR; 179/100.1 B, 100.4 M; 358/128, 129

[56] References Cited

U.S. PATENT DOCUMENTS

| | | | |
|---|---|---|---|
| 3,135,379 | 6/1964 | Naudain | 260/998.16 |
| 3,842,194 | 10/1974 | Clemens | 179/100.1 B |
| 3,859,389 | 1/1975 | Carty et al. | 260/884 |
| 3,919,137 | 11/1975 | Dyer et al. | 260/884 |
| 3,975,321 | 8/1976 | Heiberger | 260/23 XA |

OTHER PUBLICATIONS

Electronics Sep. 27, 1973, pp. 93–99.

*Primary Examiner*—Ronald W. Griffin
*Attorney, Agent, or Firm*—H. Christoffersen; Birgit E. Morris

[57] ABSTRACT

A vinyl chloride based injection molding composition comprises a vinyl chloride-propylene copolymer, a mercapto tin stabilizer, an acrylic processing aid and an ester wax lubricant. This composition has excellent flow characteristics and can form molded articles with sub-micron dimensional details and excellent surface characteristics.

2 Claims, No Drawings

VINYL CHLORIDE BASED INJECTION MOLDING COMPOSITION

This invention relates to a novel plastic molding composition. More particularly, this invention relates to an injection moldable polyvinyl chloride based composition.

BACKGROUND OF THE INVENTION

Polyvinyl chloride has enjoyed widespread use for molding various products because of its low cost and ability to be compounded with a variety of additives to obtain plastics having a wide range of physical properties and thus to satisfy a wide variety of needs. Most polyvinyl chloride is processed by calendaring, by extruding or by compression molding. The injection molding process, which gives better product uniformity, and higher automation capability, became practical for polyvinyl chloride with the advent of screw injection molding machines. Injection molding operates by forcing a molten plastic composition under high shear through a small orifice into a cold mold and then allowing the plastic to cool to a solid. The pressure used during injection molding may be about 20,000 pounds per square inch (1406 kilograms per centimeter) under mold pressures of 1-5 tons/in$^2$ (1.57-7.87 kilograms per square mm). In a screw injection molding machine, pellets of the plastic composition are fed into the feed end of the screw where the plastic is melted and thoroughly mixed and forced through a nozzle at the discharge end which injects the molten material into the mold. When the plastic has solidified, the mold is opened and the molded part removed.

Polyvinyl chloride injection molding compositions are known which are more than adequate for forming most articles; however, known molding compositions are inadequate when large articles having very fine details are to be made. For example, Clemens in U.S. Pat. No. 3,842,194 has described a 12 inch (30.5 cm) diameter information disc having a spiral groove with a pitch of from 5,000-10,000 grooves per inch (1,968-3,937 grooves per centimeter) which has video information in the form of a surface relief pattern in the groove. The pattern elements are very small, on the order of sub-micron dimensions. Color and audio information are also part of the complex information pattern. Such discs have conventionally been made by compression molding, which requires separate steps of fabricating the molding composition and pelletizing it, remelting to form a preform of the desired size and finally molding the material under pressure in a hot mold and cooling to solidify the plastic. Attempts to prepare a molding composition from which a video disc can be injection molded have failed heretofore because fidelity of the information pattern could not be maintained along the whole surface of the disc. In particular, the molten plastic, which was injected into the center of a cool mold, tended to harden before it spread to the outer edges of the disc. To eliminate this problem, the molding composition must be heated to comparatively high temperatures, where both the molding composition itself and the additives tend to be unstable, forming volatile byproducts which adversely affect the surface quality of the molded article. At high temperatures the ingredients also tend to separate, evidenced by staining. The high shear rates encountered during injection molding also cause separation of the components such as stabilizers and lubricants, also causing surface staining and inhomogeneities. Thus an improved molding composition, which can be employed to injection mold large articles with very fine surface details, has been sought.

SUMMARY OF THE INVENTION

An improved injection molding composition comprises a vinyl chloride-propylene copolymer, a solid mercapto tin stabilizer, an acrylic processing aid and an ester wax lubricant.

DETAILED DESCRIPTION OF THE INVENTION

In order to be able to injection mold video discs of commercial quality, the molding composition must be able to withstand high shear and processing temperatures up to about 200° C. without degradation or production of volatiles or separation of the components; must have melt flow properties which will allow replication of thousands of video discs from a metal stamper with good replication definition of sub-micron size video information relief patterns and good surface properties. All of the components of the molding composition must be compatible during compounding, molding and disc playback, and they must remain so under conditions encountered during subsequent coating operations and environmental storage conditions, including high temperature and high humidity.

The molding composition of the present invention has a polyvinyl chloride base. The resin employed must have good melt flow characteristics, low volatility and low moisture sensitivity. Suitable polymers include low molecular weight polyvinyl chloride homopolymers, such as Firestone Company's FPC-965, or copolymers of polyvinyl chloride with from about 6-8 percent by weight of propylene. A suitable copolymer is commercially available as AP-480 from Air Products and Chemicals, Inc. Mixtures of a vinyl chloride propylene copolymer and polyvinyl chloride homopolymer can also be employed.

In order to form an injection moldable composition from this polymer base, a stabilizer, processing aid and lubricant system must also be added.

The stabilizer should impart good heat stability to the resin and have low volatility at temperatures up to 200° C. The stabilizer preferred herein is dibutyl tin-$\beta$-mercaptopropionate in an amount of from about 1.0-3.0 percent by weight of the total molding composition. This compound is commercially available as T-35 from M&T Chemical, Inc.

A processing aid is also employed to provide a uniform melt flow across the mold surface during the fill cycle. The processing aid must be compatible with the other components and must be non-volatile at processing temperatures. A suitable processing aid for use herein is an acrylic polymer commercially available as K-175 from Rohm & Haas Company. This processing aid can be used alone or mixed with other processing aids of the acrylic type such as K-147, K-120 ND or K-125, all from Rohm & Haas, or Durostrength 200 of M&T Chemical, Inc. or SCC 7149 of Stauffer Chemical Co. The total processing aid is added in amounts of from about 1-3 percent by weight of the total molding composition.

The lubricant system employed must provide both internal and external lubrication during compounding and molding and must also have low volatility; it aids the melt flow characteristics and also provides good release of the molded disc from the mold. Ester waxes of the monofatty acid and alcohol type or polyfunctional acid-alcohol types are suitable. Presently preferred products are commercially available from Henkel International as Loxiol G-30, G-47 or G-70. The lubricants can be employed separately or in combination. Preferably, a mixture of a monofatty acid ester lubricant (G-30 and G-47) and a polyfunctional acid ester lubricant (G-70) is employed, so that the minimum amounts of each can be used to obtain the desired lubricity in the molding composition, while lessening the risk of separation or bleed out of the lubricant from the other components during molding or storage. Amounts of from about 0.2–1.0 percent by weight of the molding composition can be employed. Preferably from 0.25–1.0 percent of G-30 or G-47 are employed and from about 0.1–0.5 percent of G-70.

The above molding composition has a high heat stability when heated to temperatures up to about 200° C. in a screw injection molding machine; it produces excellent video discs with no surface defects; it does no damage to the metal stampers even after thousands of disc replicas have been made; and discs made from it are insensitive to environmental conditions such as high temperature and humidity on storage and have good heat distortion characteristics under such conditions.

The above ingredients can be mixed in a high intensity mixer. The resin and stabilizer are first mixed together at room temperature, the temperature is increased to about 135° F. (57° C.) when the processing aid is added. The temperature is increased to 165° F. (74° C.) and the lubricants added. The temperature is increased again to about 200° F. (93° C.), then blended at a low speed for about 10 minutes and cooled to room temperature. The blended material is then transferred to an extruder where it is plasticated and pelletized.

Alternatively, the blended material can be metered directly to a screw injection molding machine where it is melted, mixed and molded in one automated operation.

The invention will be described in further detail in the following Examples, but the invention is not meant to be limited to the details described therein. In the Examples, parts and percentages are by weight.

EXAMPLE 1

A molding composition was prepared in a high intensity mixer by charging a polyvinyl chloride-6 percent propylene copolymer resin at room temperature, adding a tin stabilizer when the resin temperature reached about 135° F. (57° C.), adding a processing aid when the temperature reached 165° F. (74° C.) and adding lubricants at 185° F. (85° C.). When the temperature reached 225° F. (107° C.), the mixer was turned to low speed and mixing continued for an additional 10 minutes. The molding composition contained 95.25 percent of AP-480 resin, 2.0 percent of dibutyl tin-β-mercaptopropionate stabilizer, 2.0 percent of acrylic resin K-175, 0.25 percent of Loxiol G-70 lubricant and 0.5 percent of Loxiol G-30 lubricant, all percentages based on the total weight of the molding composition.

The dry blended composition was transferred to a twin screw extruder with temperature zone settings from 305°–325° F. (152°–163° C.) for melt blending and the extrudate was pelletized and cooled.

The pellets were charged to an injection molding machine using a video disc master as described in Clemens referred to above. Over 1500 discs were made on a single stamper with no staining or surface defects.

Thermogravimetric analysis (TGA) both of pellets of the molding compound and of molded discs showed no loss in weight while heating in argon below 240° C. Differential scanning calorimetry (DSC) showed no degradation of the molding composition. Samples were taken from three batches of the molding composition and of discs molded therefrom. The data are summarized below.

| Sample | TGA Onset of Weight Loss, °C | Temperature of Maximum Weight Loss, °C |
|---|---|---|
| pellet, batch 1 | 247 | 305 |
| molded disc, batch 1 | 247 | 307 |
| pellet, batch 2 | 240 | 300 |
| molded disc, batch 2 | 245 | 307 |
| pellet, batch 3 | 246 | 310 |
| molded disc, batch 3 | 260 | 320 |

| Sample | DSC Stress Endotherm | $T_g$ Endotherm |
|---|---|---|
| pellet, batch 1 | 58–65 | 73–75 |
| molded disc, batch 1 | 50–52 | 76–78 |
| pellet, batch 2 | 57–62 | 74–75 |
| molded disc, batch 2 | 52 | 78 |
| pellet, batch 3 | 57–65 | 75–80 |
| molded disc, batch 3 | 51 | 77 |

Molecular weight determinations were made using a gas pressure chromatograph comparing the molding composition in pellet form and molded samples. No significant differences in molecular weight or molecular weight distribution were noted, indicating excellent stability of the samples.

EXAMPLES 2–15

Various changes were made in the amounts of the various additives of Example 1 with little change in processability as measured by fusion time and fusion torque in a Brabender Plasticorder. The data are summarized below where torque is measured in meter-grams (MG).

| Example | COMPOSITION, PERCENTAGE | | | | Fusion Time, Minutes | Fusion Torque, MG |
|---|---|---|---|---|---|---|
| | Stabilizer | Processing Aid | Loxiol G-30 | Loxiol G-70 | | |
| 1 | 2.0 | 2.0 | 0.5 | 0.25 | .75 | 4000 |
| 2 | 1.0 | 2.0 | 0.5 | 0.25 | .75 | 4250 |
| 3 | 1.5 | 2.0 | 0.5 | 0.25 | .85 | 4125 |
| 4 | 2.5 | 2.0 | 0.5 | 0.25 | .85 | 3875 |
| 5 | 3.0 | 2.0 | 0.5 | 0.25 | 1.1 | 3750 |
| 6 | 2.0 | 1.0 | 0.5 | 0.25 | .75 | 4000 |
| 7 | 2.0 | 1.5 | 0.5 | 0.25 | .70 | 4250 |
| 8 | 2.0 | 2.5 | 0.5 | 0.25 | .85 | 3875 |
| 9 | 2.0 | 3.0 | 0.5 | 0.25 | 1.0 | 3500 |
| 10 | 2.0 | 2.0 | 0.25 | 0.25 | .80 | 4000 |
| 11 | 2.0 | 2.0 | 0.75 | 0.25 | 1.0 | 4000 |
| 12 | 2.0 | 2.0 | 0.5 | 0.15 | .70 | 4000 |
| 13 | 2.0 | 2.0 | 0.5 | 0.35 | 1.0 | 3750 |
| 14 | 2.0 | 2.0 | 0.75 | — | .80 | 4000 |
| 15 | 2.0 | 2.0 | 1.0 | — | 1.0 | 3750 |

EXAMPLE 16

The procedure of Example 1 was followed except that Loxiol G-47 was substituted for the lubricants of Example 1. The data are summarized below.

| Lubricant, Percent | Fusion, min. | Fusion Torque, MG |
|---|---|---|
| 0.5 | .70 | 4250 |
| 0.75 | .70 | 4000 |
| 1.0 | 1.0 | 3750 |

COMPARATIVE EXAMPLES

The following compositions did not prove suitable for the present application, either due to problems during injection molding or on playback of the molded discs. Composition A — A molding composition was prepared following the general procedure of Example 1 using a polyvinyl chloride homopolymer, Firestone Company's FPC-965, 2 percent of dibutyl tin β-mercaptopropionate, 0.5 percent of tin maleate, 2 percent of the acrylic processing aid of Example 1, and 0.15 percent of an oxidized polyethylene wax lubricant commercially available as 629A from Allied Chemical Corporation.

This composition had to be annealed to prevent warping of the discs after molding and some staining of the discs was noted. Composition B — A molding composition was prepared as in Part A using the copolymer of Example 1, 2 percent of dibutyl tin-β-mercaptopropionate stabilizer, 0.5 percent of tin maleate stabilizer, 2 percent of the processing aid of Example 1, 0.15 percent of an oxidized polyethylene wax AC-629A of Allied Chemical Company and 0.5 percent of an esterified montan wax, Wax E of the Hoechst Company. This composition stained badly, particularly at the outside rim of the molded video discs. Composition C — A molding composition was prepared as in Part A using the copolymer resin of Example 1, 2 percent of the dibutyl tin-β-mercaptopropionate stabilizer, 2 percent of the processing aid of Example 1, 0.5 percent of an esterified montan wax lubricant, Wax E, and 0.4 percent of Wax OP, also from the Hoechst Company. This composition showed less staining than the other compositions, but still stained after about 500 discs were processed from a new master.

We claim:

1. An injection molding composition comprising a vinyl chloride-propylene copolymer containing about 6-8 percent by weight of propylene; from about 1-3 percent by weight of the molding composition of a solid mercapto tin stabilizer; from about 1-3 percent by weight of the molding composition of an acrylic resin processing aid; and a mixture of from about 0.25-1 percent by weight of the molding composition of an ester wax of a monofatty acid and alcohol lubricant and from about 0.1-0.5 percent by weight of the molding composition of an ester wax of a polyfunctional acid and alcohol lubricant.

2. A composition according to claim 1 wherein the stabilizer is dibutyl tin-β-mercaptopropionate.

* * * * *